(12) United States Patent
Rasanen (10) Patent No.: US 10,298,409 B2
(45) Date of Patent: May 21, 2019

(54) CONDITIONAL POLICY CONTROL

(71) Applicant: NOKIA SOLUTIONS AND NETWORKS OY, Espoo (FI)

(72) Inventor: Juha Antero Rasanen, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 49 days.

(21) Appl. No.: 14/391,505

(22) PCT Filed: Apr. 5, 2013

(86) PCT No.: PCT/EP2013/057191
§ 371 (c)(1),
(2) Date: Oct. 9, 2014

(87) PCT Pub. No.: WO2013/152997
PCT Pub. Date: Oct. 17, 2013

(65) Prior Publication Data
US 2015/0071127 A1 Mar. 12, 2015

(30) Foreign Application Priority Data
Apr. 11, 2012 (WO) ............... PCT/EP2012/056524

(51) Int. Cl.
*H04L 12/14* (2006.01)
*G06Q 30/00* (2012.01)
(Continued)

(52) U.S. Cl.
CPC ......... *H04L 12/1407* (2013.01); *G06Q 30/00* (2013.01); *G06Q 30/0283* (2013.01); *H04M 15/66* (2013.01)

(58) Field of Classification Search
CPC ............... H04L 12/1407; G06Q 30/00; G06Q 30/0283; H04M 15/66
See application file for complete search history.

(56) References Cited

U.S. PATENT DOCUMENTS

2009/0182883 A1 7/2009 Giaretta et al.
2009/0254494 A1 10/2009 Li et al.
(Continued)

OTHER PUBLICATIONS

International Search Report and Written Opinion dated Sep. 12, 2013 corresponding to International Application No. PCT/EP2013/057191.
(Continued)

*Primary Examiner* — Lonnie V Sweet
(74) *Attorney, Agent, or Firm* — Squire Patton Boggs (US) LLP (57) ABSTRACT

It is provided an apparatus, comprising condition determining means adapted to determine a currently valid condition; selecting means adapted to select a rule-condition pair for a policy controlled object of a user based on the currently valid condition and a received message comprising a first rule-condition pair and a second rule-condition pair for the user, and wherein each of the first and second rule-condition pairs comprises a respective policy rule and a corresponding condition when the respective policy rule is to be applied; rule setting means adapted to set the policy rule comprised in the selected rule-condition pair for the policy controlled object of the user; rule applying means adapted to apply the set policy rule to the policy controlled object of the user.

4 Claims, 6 Drawing Sheets

(51) Int. Cl.
*G06Q 30/02* (2012.01)
*H04M 15/00* (2006.01)

(56) References Cited

U.S. PATENT DOCUMENTS

| | | | |
|---|---|---|---|
| 2011/0067085 A1* | 3/2011 | Brouard | H04L 12/14 726/1 |
| 2012/0036186 A1* | 2/2012 | Mariblanca Nieves | H04L 12/14 709/203 |
| 2012/0129488 A1* | 5/2012 | Patterson | H04M 15/50 455/406 |
| 2012/0331516 A1* | 12/2012 | Perez Martinez | H04L 63/0245 726/1 |
| 2013/0085909 A1* | 4/2013 | Mo | G06Q 40/025 705/30 |
| 2013/0262308 A1* | 10/2013 | Cai | G06Q 20/145 705/44 |

OTHER PUBLICATIONS

3GPP TS 29.212 V11.4.0 (Mar. 2012), Technical Specification, 3rd Generation Partnership Project; Technical Specification Group Core Network and Terminals; Policy and Charging Control (PCC) over Gx/Sd Reference Point (Release 11), Mar. 2012, 181 pages.

3GPP TS 23.203 V11.3.0 (Sep. 2011), Technical Specification, 3rd Generation Partnership Project; Technical Specification Group Services and System Aspects; Policy and Charging Control Architecture (Release 11), Sep. 2011, 167 pages.

3GPP TS 29.219 V11.0.0 (Mar. 2012), Technical Specification, 3rd Generation Partnership Project; Technical Specification Group Core Network and Terminals; Policy and Charging Control: Spending Limit Reporting Over Sy reference Point (Release 11), Mar. 2012, 20 pages.

SA WG2 Meeting #87, S2-114202, Oct. 10-14, 2011, Jeju, South Korea, "Deferred Policy Counter Status Reporting on Sy," Nokia Siemens Networks, SA WG2, CR-Form-v9.9, 23.203 CR, 0585, current version: 11.3.0, 2 pages.

* cited by examiner

CONDITIONAL POLICY CONTROL

FIELD OF THE INVENTION

The present invention relates to an apparatus, a method, a system, and a computer program product related to policy and/or charging control. More particularly, the present invention relates to an apparatus, a method, a system, and a computer program product for policy and/or charging control under globally defined conditions.

BACKGROUND OF THE INVENTION

Abbreviations

3GPP 3$^{rd}$ generation partnership project
GW Gateway
IMS IP multimedia subsystem
IP Internet protocol
IP-CAN IP connectivity access network
OCS Online charging system
PCC Policy and charging control
PCEF Policy and charging enforcement function
PCRF Policy and charging rules function
P-GW Packet data network gateway
QoS Quality of service
Rel Release
SPR Subscription profile repository
TS Technical Specification
UE User equipment Policy/QoS control based on subscriber spending limits is standardized by 3GPP in Rel-11.

As specified in Rel-11, the PCRF subscribes to changes of policy counter statuses (of a given subscriber) by sending a request to OCS. The OCS sends the current statuses of the subscribed counters (of the subscriber) in the reply to the PCRF. The PCRF applies QoS/policies (PCC rules) defined for/corresponding to the statuses of the policy counters. Then after that the OCS notifies PCRF every time a status change exceeding a defined threshold takes place, and the PCRF updates the QoS/policies (PCC rules) for the user session accordingly.

Policy information change based on a change of a general condition, e.g. time of day or some less regular event, causes a need for the OCS to update a number of various policy counters of different users and report the changes over user specific sessions to the PCRF. The PCRF shall update the corresponding PCC rules of different user sessions to the PCEF. Consequently, the change of a general condition causes a flush of message both at the Sy interface (between OCS and PCRF) and at the Gx interface (between PCRF and PCEF). And further, a signalling traffic peak is caused on the user plane to signal the QoS change between the network and all related UEs, overloading both access network interfaces and related access network elements.

The following documents provide background information and requirements referred to in this report:
  3GPP TS 23.203, version 11.3.0
  3GPP draft TS 29.219, version 0.1.2
  3GPP document S2-114202.

The last of these documents proposes a solution for the Sy interface. According to this document, the OCS may provide policy counter status change information to the PCRF in a deferred mode. The OCS may indicate a time at which the status change occurs. However, this solution may result in problems with regulatory authorities requesting a high (e.g. 200-300 msec) time accuracy of a tariff change. Moreover, the solution does not remove the flush of messages, i.e. the number of required message exchanges, but only alleviates the problem by spreading the peak of messages over a wider period of time.

SUMMARY OF THE INVENTION

It is an object of the present invention to improve the prior art.

According to a first aspect of the invention, there is provided an apparatus, comprising identifying means adapted to identify a policy controlled object related to a user based on a received request message from a policy and charging rules function; pair providing means adapted to provide, in a response message to the policy and charging rules function, a first status-condition pair and a second status-condition pair of the policy controlled object, wherein each of the first and second status-condition pairs comprises a respective status of the policy controlled object and a corresponding condition when the respective status is to be applied.

In the apparatus, the response message may additionally comprise an indication of the currently valid condition.

The apparatus may further comprise condition indicating means adapted to indicate, to the policy and charging rules function, a change of a currently valid condition, wherein the indication is independent from the user.

In the apparatus, the policy controlled object may comprise a counter.

According to a second aspect of the invention, there is provided an apparatus, comprising identifying processor adapted to identify a policy controlled object related to a user based on a received request message from a policy and charging rules function; pair providing processor adapted to provide, in a response message to the policy and charging rules function, a first status-condition pair and a second status-condition pair of the policy controlled object, wherein each of the first and second status-condition pairs comprises a respective status of the policy controlled object and a corresponding condition when the respective status is to be applied.

In the apparatus, the response message may additionally comprise an indication of the currently valid condition.

The apparatus may further comprise condition indicating processor adapted to indicate, to the policy and charging rules function, a change of a currently valid condition, wherein the indication is independent from the user.

In the apparatus, the policy controlled object may comprise a counter.

According to a third aspect of the invention, there is provided an online charging system, comprising an apparatus according to the first aspect; and an online charging means for the user.

According to a fourth aspect of the invention, there is provided an online charging system, comprising an apparatus according to the first aspect; and an online charging processor for the user.

According to a fifth aspect of the invention, there is provided an apparatus, comprising condition determining means adapted to determine a currently valid condition; selecting means adapted to select a rule-condition pair for a policy controlled object of a user based on the currently valid condition and a received message comprising a first rule-condition pair and a second rule-condition pair for the user, and wherein each of the first and second rule-condition pairs comprises a respective policy rule and a corresponding condition when the respective policy rule is to be applied;

rule setting means adapted to set the policy rule comprised in the selected rule-condition pair for the policy controlled object of the user; rule applying means adapted to apply the set policy rule to the policy controlled object of the user.

The apparatus may further comprise pair providing means adapted to provide a third rule-condition pair and a fourth rule-condition pair for the policy controlled object of the user to a first other device, wherein each of the third and fourth rule-condition pairs comprises a respective policy rule and a corresponding condition, and wherein the third and fourth rule-condition pairs are based on the first and second rule-condition pairs, respectively.

The apparatus may further comprise rule providing means adapted to provide the policy rule comprised in the selected rule-condition pair to a second other device.

The apparatus may further comprise checking means adapted to check if a capability indication is received from the first other device, wherein the capability indication indicates a capability of the first other device to select one of the third and fourth rule-condition pairs; and preventing means adapted to prevent, if the checking is not affirmative, the pair providing means from providing the third and fourth rule-condition pairs.

In the apparatus, the respective policy rules of the rule-condition pairs may comprise respective quality of service parameters.

In the apparatus, the condition determining means may be adapted to determine the currently valid condition based on a detected event.

In the apparatus, the detected event may comprise any of a receipt of a message indicating the currently valid condition, a time, a date, a time period, and an external trigger.

In the apparatus, the currently valid condition may be independent from the user.

The apparatus may further comprise capability indicating means adapted to indicate a capability of the apparatus to select a rule-condition pair from the received message.

According to a sixth aspect of the invention, there is provided an apparatus, comprising condition determining processor adapted to determine a currently valid condition; selecting processor adapted to select a rule-condition pair for a policy controlled object of a user based on the currently valid condition and a received message comprising a first rule-condition pair and a second rule-condition pair for the user, and wherein each of the first and second rule-condition pairs comprises a respective policy rule and a corresponding condition when the respective policy rule is to be applied; rule setting processor adapted to set the policy rule comprised in the selected rule-condition pair for the policy controlled object of the user; rule applying processor adapted to apply the set policy rule to the policy controlled object of the user.

The apparatus may further comprise pair providing processor adapted to provide a third rule-condition pair and a fourth rule-condition pair for the policy controlled object of the user to a first other device, wherein each of the third and fourth rule-condition pairs comprises a respective policy rule and a corresponding condition, and wherein the third and fourth rule-condition pairs are based on the first and second rule-condition pairs, respectively.

The apparatus may further comprise rule providing processor adapted to provide the policy rule comprised in the selected rule-condition pair to a second other device.

The apparatus may further comprise checking processor adapted to check if a capability indication is received from the first other device, wherein the capability indication indicates a capability of the first other device to select one of the third and fourth rule-condition pairs; and preventing processor adapted to prevent, if the checking is not affirmative, the pair providing processor from providing the third and fourth rule-condition pairs.

In the apparatus, the respective policy rules of the rule-condition pairs may comprise respective quality of service parameters.

In the apparatus, the condition determining processor may be adapted to determine the currently valid condition based on a detected event.

In the apparatus, the detected event may comprise any of a receipt of a message indicating the currently valid condition, a time, a date, a time period, and an external trigger.

In the apparatus, the currently valid condition may be independent from the user.

The apparatus may further comprise capability indicating processor adapted to indicate a capability of the apparatus to select a rule-condition pair from the received message.

According to a seventh aspect of the invention, there is provided an apparatus, comprising policy rules determining means adapted to determine a first rule-condition pair and a second rule-condition pair for a policy controlled object related to a user, wherein the first rule-condition pair and the second rule-condition pair are determined based on a first status-condition pair of the policy controlled object and a second status-condition pair of the policy controlled object, respectively, each of the first and second rule-condition pairs comprises a respective policy rule and a corresponding condition when the respective policy rule is to be applied, and the first and second status-condition pairs are comprised in a received message; and providing means adapted to provide the first rule-condition pair and the second rule-condition pair to a policy and charging enforcement function.

According to an eighth aspect of the invention, there is provided an apparatus, comprising policy rules determining processor adapted to determine a first rule-condition pair and a second rule-condition pair for a policy controlled object related to a user, wherein the first rule-condition pair and the second rule-condition pair are determined based on a first status-condition pair of the policy controlled object and a second status-condition pair of the policy controlled object, respectively, each of the first and second rule-condition pairs comprises a respective policy rule and a corresponding condition when the respective policy rule is to be applied, and the first and second status-condition pairs are comprised in a received message; and providing processor adapted to provide the first rule-condition pair and the second rule-condition pair to a policy and charging enforcement function.

According to a ninth aspect of the invention, there is provided an apparatus, comprising rule-condition pair generating means adapted to determine a first rule-condition pair and a second rule-condition pair for a policy controlled object related to a user, wherein each of the first and second rule-condition pairs comprises a respective policy rule and a corresponding condition when the respective policy rule is to be applied, the first rule-condition pair and the second rule-condition pair are determined based on a status information of the policy controlled object comprised in a message received from a first device; and providing means adapted to provide the first rule-condition pair and the second rule-condition pair to a policy and charging enforcement function.

In the apparatus, the policy rules determining means may be additionally adapted to determine the first rule-condition pair and the second rule-condition pair based on a further information received from a second device different from the first device.

In the apparatus, the first device may comprise an online charging system and the second device may comprise a subscription profile repository.

In the apparatus, the further information may comprise one of a policy counter, a usage monitoring control information, and a user plane event reporting control information.

In the apparatus, each of the policy rules may comprise one or more usage reporting thresholds or triggers for user plane event reporting.

According to a tenth aspect of the invention, there is provided an apparatus, comprising rule-condition pair generating processor adapted to determine a first rule-condition pair and a second rule-condition pair for a policy controlled object related to a user, wherein each of the first and second rule-condition pairs comprises a respective policy rule and a corresponding condition when the respective policy rule is to be applied, the first rule-condition pair and the second rule-condition pair are determined based on a status information of the policy controlled object comprised in a message received from a first device; and providing processor adapted to provide the first rule-condition pair and the second rule-condition pair to a policy and charging enforcement function.

In the apparatus, the policy rules determining processor may be additionally adapted to determine the first rule-condition pair and the second rule-condition pair based on a further information received from a second device different from the first device.

In the apparatus, the first device may comprise an online charging system and the second device may comprise a subscription profile repository.

In the apparatus, the further information may comprise one of a policy counter, a usage monitoring control information, and a user plane event reporting control information.

In the apparatus, each of the policy rules may comprise one or more usage reporting thresholds or triggers for user plane event reporting.

In the apparatus according to any of the fifth to tenth aspects, the policy controlled object may comprise a counter.

According to an eleventh aspect of the invention, there is provided a policy and charging rules function, comprising an apparatus according to any of the fifth, seventh, and ninth aspects, and ruling means adapted to apply a fifth policy rule to the policy controlled object of the user.

According to a twelfth aspect of the invention, there is provided a policy and charging rules function, comprising an apparatus according to any of the sixth, eighth, and tenth aspects, and ruling processor adapted to apply a fifth policy rule to the policy controlled object of the user.

According to a thirteenth aspect of the invention, there is provided a policy and charging enforcement function, comprising an apparatus according to the fifth aspect, and enforcing means adapted to enforce a rule received from a PCRF apparatus.

According to a fourteenth aspect of the invention, there is provided a policy and charging enforcement function, comprising an apparatus according to the sixth aspect, and enforcing processor adapted to enforce a rule received from a PCRF apparatus.

According to a fifteenth aspect of the invention, there is provided an access network, comprising an apparatus according to the fifth aspect, and accessing means adapted to provide an access of a user equipment of the user to a network comprising a policy and charging enforcement function.

According to a sixteenth aspect of the invention, there is provided an access network, comprising an apparatus according to the sixth aspect, and accessing processor adapted to provide an access of a user equipment of the user to a network comprising a policy and charging enforcement function.

According to a seventeenth aspect of the invention, there is provided a user equipment, comprising an apparatus according to the fifth aspect, and user equipment means adapted to provide a user equipment function for the user to a network comprising a policy and charging enforcement function.

According to an eighteenth aspect of the invention, there is provided a user equipment, comprising an apparatus according to the sixth aspect, and user equipment processor adapted to provide a user equipment function for the user to a network comprising a policy and charging enforcement function.

According to a nineteenth aspect of the invention, there is provided a method, comprising identifying a policy controlled object related to a user based on a received request message from a policy and charging rules function; providing, in a response message to the policy and charging rules function, a first status-condition pair and a second status-condition pair of the policy controlled object, wherein each of the first and second status-condition pairs comprises a respective status of the policy controlled object and a corresponding condition when the respective status is to be applied.

In the method, the response message may additionally comprise an indication of the currently valid condition.

The method may further comprise indicating, to the policy and charging rules function, a change of a currently valid condition, wherein the indication is independent from the user.

In the method, the policy controlled object may comprise a counter.

According to a twentieth aspect of the invention, there is provided a method, comprising determining a currently valid condition; selecting a rule-condition pair for a policy controlled object of a user based on the currently valid condition and a received message comprising a first rule-condition pair and a second rule-condition pair for the user, and wherein each of the first and second rule-condition pairs comprises a respective policy rule and a corresponding condition when the respective policy rule is to be applied; setting the policy rule comprised in the selected rule-condition pair for the policy controlled object of the user; applying the set policy rule to the policy controlled object of the user.

The method may further comprise providing a third rule-condition pair and a fourth rule-condition pair for the policy controlled object of the user to a first other device, wherein each of the third and fourth rule-condition pairs comprises a respective policy rule and a corresponding condition, and wherein the third and fourth rule-condition pairs are based on the first and second rule-condition pairs, respectively.

The method may further comprise providing the policy rule comprised in the selected rule-condition pair to a second other device.

The method may further comprise checking if a capability indication is received from the first other device, wherein the capability indication indicates a capability of the first other device to select one of the third and fourth rule-condition pairs; and preventing, if the checking is not affirmative, providing the third and fourth rule-condition pairs.

In the method, the respective policy rules of the rule-condition pairs may comprise respective quality of service parameters.

In the method, the currently valid condition may be determined based on a detected event.

In the method, the detected event may comprise any of a receipt of a message indicating the currently valid condition, a time, a date, a time period, and an external trigger.

In the method, the currently valid condition may be independent from the user.

The method may further comprise indicating a capability of an apparatus performing the method to select a rule-condition pair from the received message.

According to a twenty-first aspect of the invention, there is provided a method, comprising determining a first rule-condition pair and a second rule-condition pair for a policy controlled object related to a user, wherein the first rule-condition pair and the second rule-condition pair are determined based on a first status-condition pair of the policy controlled object and a second status-condition pair of the policy controlled object, respectively, and the first and second status-condition pairs are comprised in a received message; and providing the first rule-condition pair and the second rule-condition pair to a policy and charging enforcement function.

According to a twenty-second aspect of the invention, there is provided a method, comprising determining a first rule-condition pair and a second rule-condition pair for a policy controlled object related to a user, wherein each of the first and second rule-condition pairs comprises a respective policy rule and a corresponding condition when the respective policy rule is to be applied, the first rule-condition pair and the second rule-condition pair are determined based on a status information of the policy controlled object comprised in a message received from a first device; and providing the first rule-condition pair and the second rule-condition pair to a policy and charging enforcement function.

In the method, the first rule-condition pair and the second rule-condition pair may be determined additionally based on a further information received from a second device different from the first device.

In the method, the first device may comprise an online charging system and the second device may comprise a subscription profile repository.

In the method, the further information may comprise one of a policy counter, a usage monitoring control information, and a user plane event reporting control information.

In the method, each of the policy rules may comprise one or more usage reporting thresholds or triggers for user plane event reporting.

In the method according to any of the twentieth to twenty-second aspects, the policy controlled object may comprise a counter.

The method according to any of the nineteenth to twenty-second aspects may be a method of policy control.

According to a twenty-third aspect of the invention, there is provided a computer program product including a program comprising software code portions being arranged, when run on a processor of an apparatus, to perform the method according to any one of the eighteenth to twenty-second aspects.

The computer program product may comprise a computer-readable medium on which the software code portions are stored, and/or the program may be directly loadable into a memory of the processor.

According to embodiments of the invention, at least the following advantages are achieved:
An overload of at least some of the network entities and interfaces involved in PCC is avoided;
Modifications of the relevant rule may be performed in short time, thus regulatory requirements e.g. with respect to tariff switches may be fulfilled;
The solution may be backward compatible.

It is to be understood that any of the above modifications can be applied singly or in combination to the respective aspects which they refer to, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

According to embodiments of the invention, the OCS does not provide a single status of the subscribed counter as conventionally, but provides a plurality of pairs of status and condition. The conditions indicate when the corresponding status of the respective pair is to be applied. Each of the network entities between the OCS and the UE, i.e. PCRF, PCEF, and access network may either forward a single, selected, rule for this counter as conventionally, or it may forward several pairs of rules and condition, provided that corresponding pairs are received from the previous network entity in the chain from OCS to UE. Furthermore, at least the network entities PCEF, access network, and UE may determine which condition is currently valid and apply the corresponding rule to the counter. This is not required (but not excluded) for the PCRF since it is not involved in policy enforcement.

Note that, for the purpose of the present application, a policy rule may be a rule as provided by the PCRF to the PCEF, but it may also comprise some parameters to be applied to the respective counter, like QoS parameters or charging parameters applied by access network and/or user equipment.

According to some embodiments of the invention, in order to avoid the flush of messages on the Sy interface, instead of indicating only the current status of a given policy counter to the PCRF, the OCS may indicate several status value and condition pairs for the given counter, each status value being valid when the corresponding condition (parameter) is valid/prevailing. The condition may be e.g. time of day or a period of time. Upon recognizing the activation or deactivation of a condition, the PCRF/PCEF may then take relevant policy control actions without any need to exchange (a flush of user session related) messages between the OCS and PCRF.

According to some embodiments of the invention, there may be general conditions or events that cannot be recognized by the PCRF but can be recognized by the OCS. In such a case, the OCS may indicate the change of the condition to the PCRF with a single, general (i.e. non-user-session-specific) message to avoid a flush of user session specific/related messages through the Sy interface.

According to some embodiments of the invention, in order to avoid the flush of messages on the Gx interface, instead of indicating only the current PCC rule(s) to the PCEF, the PCRF indicates several PCC rule and condition pairs (or QoS parameter and condition pairs) for a given user session, each PCC rule (or QoS parameter) being valid when the corresponding condition (parameter) is valid/prevailing. The condition may be e.g. time of day or a period of time. Upon recognizing the activation or deactivation of a condition, the PCEF may then take relevant policy control/enforcement actions without any need to exchange (a flush of user session related) messages between the PCRF and PCEF.

According to some embodiments of the invention, there may be general conditions or events that cannot be recognized by the PCEF but can be recognized by the PCRF, e.g. through an indication from the OCS. In such a case the PCRF can indicate the change of the condition to the PCEF with a single, general (i.e. non-user-session-specific) message to avoid a flush of user session specific/related messages through the Gx interface.

Figure 1:
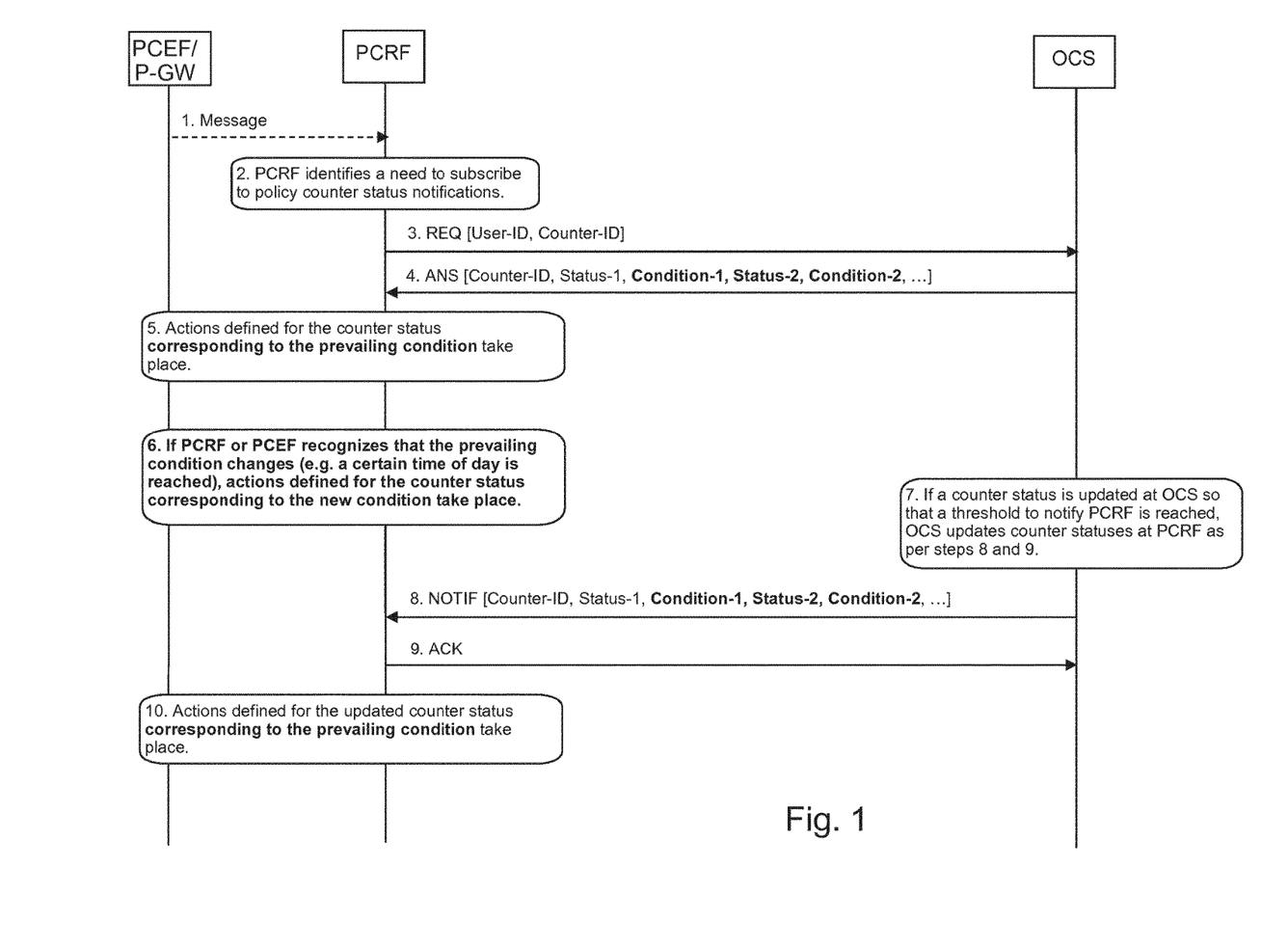
FIG. 1 shows a message flow according to an embodiment of the invention.
Figure 2:
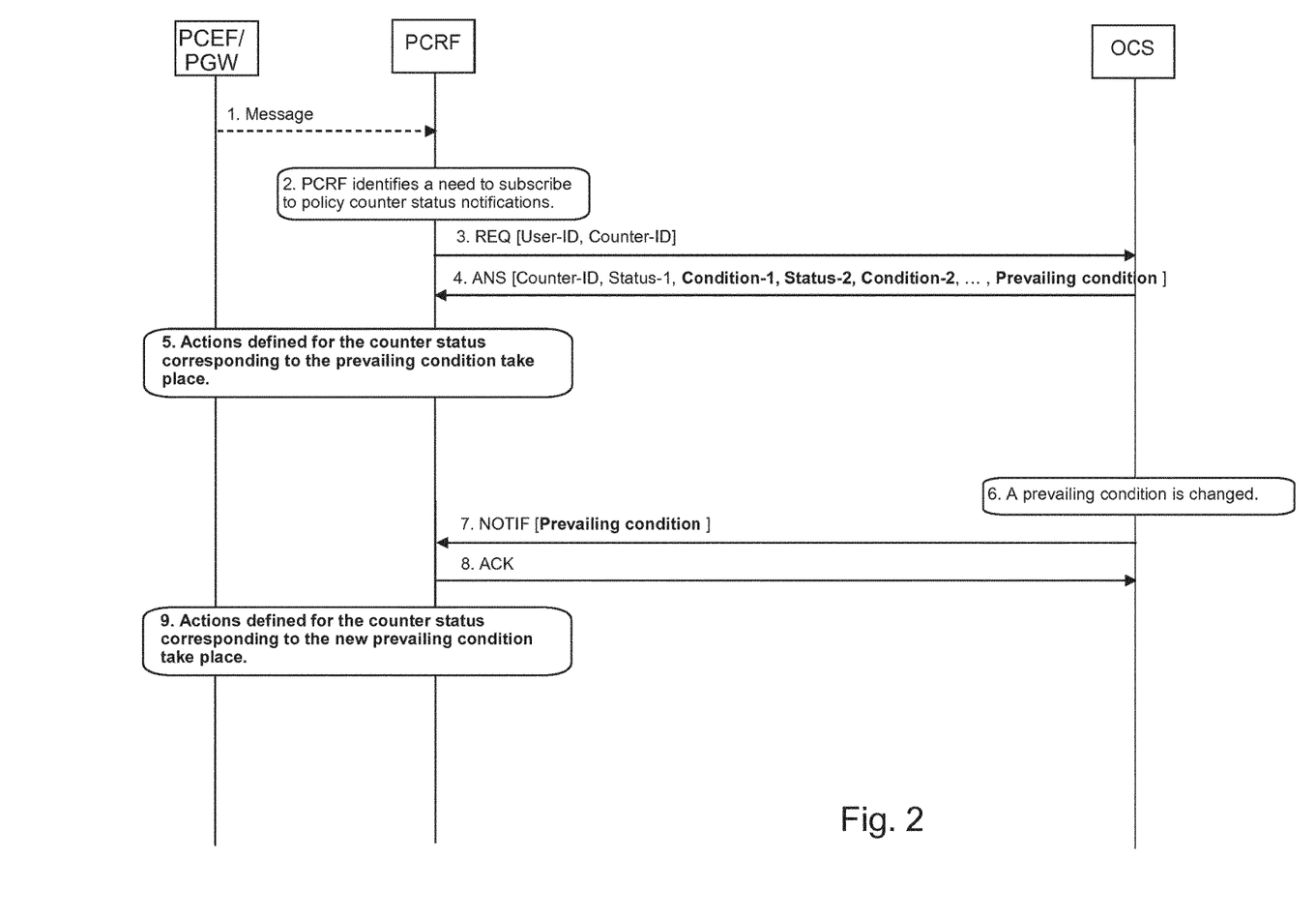
FIG. 2 shows another message flow according to an embodiment of the invention.

Details of exemplary message flows on the Sy and Gx interfaces according to some embodiments of the invention are shown in FIGS. 1 and 2:

When the PCRF identifies a need to subscribe to policy counter status notifications, typically upon an IP-CAN session establishment, the PCRF sends a request message to the OCS. The message contains a User-ID to identify the user and one or more policy counter IDs to identify the policy counters (Steps 2 and 3 in FIGS. 1 and 2).

In the reply message to the PCRF, the OCS includes (per policy counter) not just the Counter-ID and counter status, but a counter status per defined condition. There may be plural different conditions with different status values for a given policy counter. The condition may be for example a time of day, a defined period of time when the status linked to the condition should be valid, an event of any kind that can be recognized by the PCRF when it occurs (refer to step 4 in FIG. 1). The condition may also be an event that is just numbered or named and the activation of which is reported by the OCS to the PCRF, and in this case the reply message may also contain a parameter to indicate which of the conditions is valid/prevailing at the moment (refer to step 4 in FIG. 2).

The PCRF, in some embodiments with the PCEF involved, operates according to the counter status of the valid/prevailing condition. In practice that may mean, for example, that the PCC rules corresponding to the counter status of the valid/prevailing condition are activated and/or enforced.

If PCRF or PCEF recognizes, either by itself as in FIG. 1/step 6 or indicated by the OCS as in FIG. 2/steps 6-8, that the prevailing condition changes/has changed (e.g. a certain time of day is reached), actions defined for the counter status corresponding to the new condition take place. In practice that may mean, for example, that the PCC rules corresponding to the counter status of the new valid/prevailing condition are activated and/or enforced.

According to some embodiments of the invention, in order to avoid the problem of the signalling peak traffic (or increased signalling in general) on the user plane, upon an IP-CAN session establishment or modification, instead of indicating only the current/single QoS profile towards the UE, the gateway (GW) may indicate several QoS profile (or QoS parameter) and condition pairs, each QoS profile (or parameter) being valid when the corresponding condition (parameter) is valid/prevailing. The GW may also indicate which of the conditions, if any, is valid at the moment. The condition may be e.g. time of day or a period of time, or an event of any kind that can be recognized locally or though a received indication by the UE and access network when it occurs.

Upon detecting the activation or deactivation or change of a condition, the UE, access network, and/or PCEF/GW may then take relevant policy control actions by enforcing the QoS profile that corresponds to the new valid condition, i.e. without any need to exchange a flush of user session related messages between the GW and all related UEs.

According to some embodiments of the invention, there may be general conditions or events that cannot be recognized by the UE or access network but can be recognized by the GW (or access network for the UE), e.g. through an indication from the OCS via the PCEF/GW. In such a case the GW (or access network) can indicate the change of the condition to the access network/UE with a single, general (i.e. non-user-session-specific) message to avoid a flush of user session related messages through the user plane.

Furthermore, according to some embodiments of the invention, when a UE attaches to the network and an IP-CAN session is established, the UE may indicate its capability to support the signalling of several QoS profiles and related conditions. Similarly, the access network (e.g. radio access network) may add its own capability indication in the initial message exchange. The capability indications may be included in the response messages to let every involved entity be aware of every other involved entity supporting the feature. Several pairs of policy rules and conditions are provided to a UE or network element only, if a corresponding capability indication is received by the network element directly upstream in the chain from OCS to UE. Thus, backward compatibility for legacy UEs and access network elements may be ensured. According to some embodiments, corresponding capability indications may be provided upstream by PCEF and/or PCRF towards the OCS.

Figure 3:
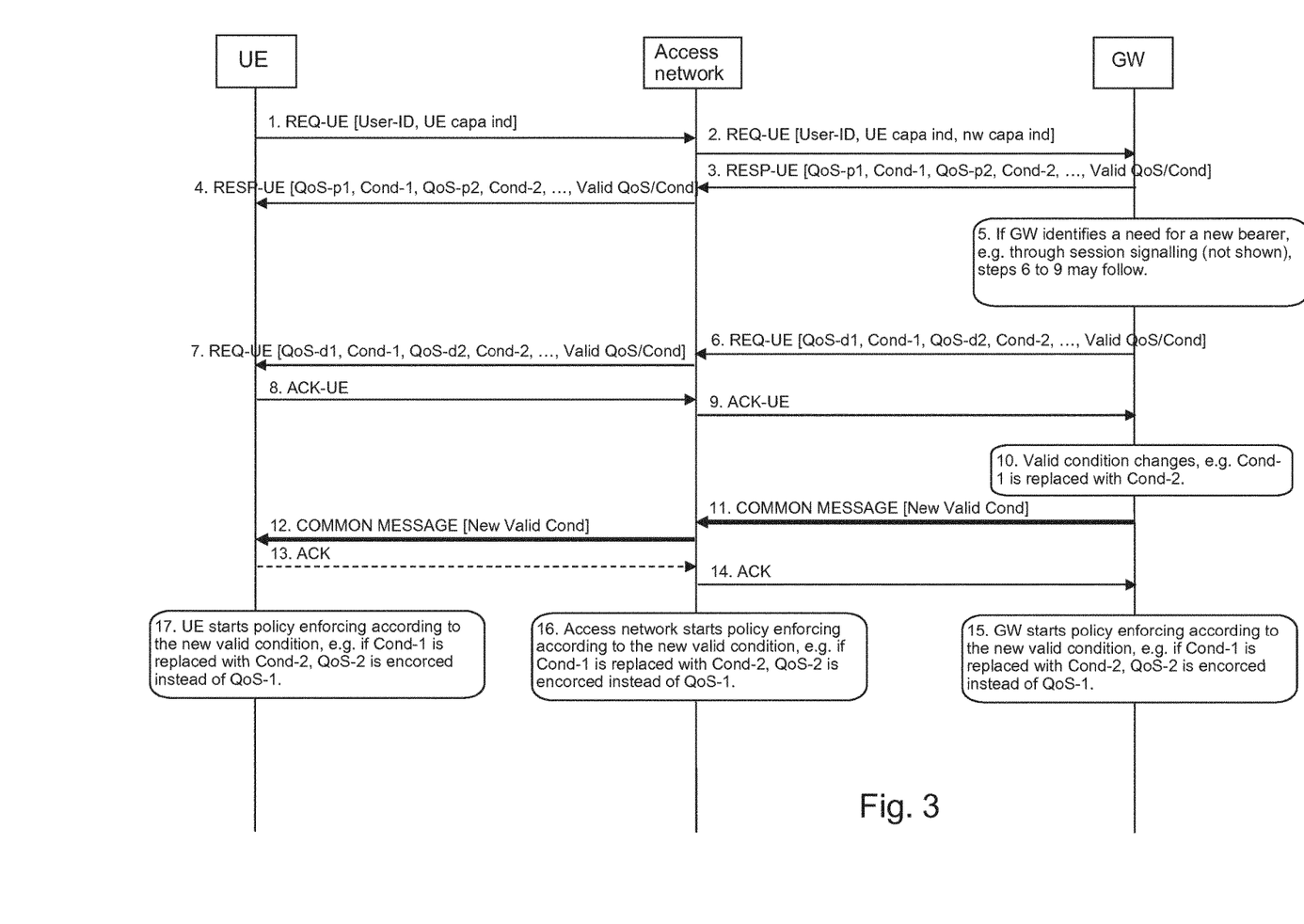
FIG. 3 shows a further message flow according to an embodiment of the invention.
Figure 4:
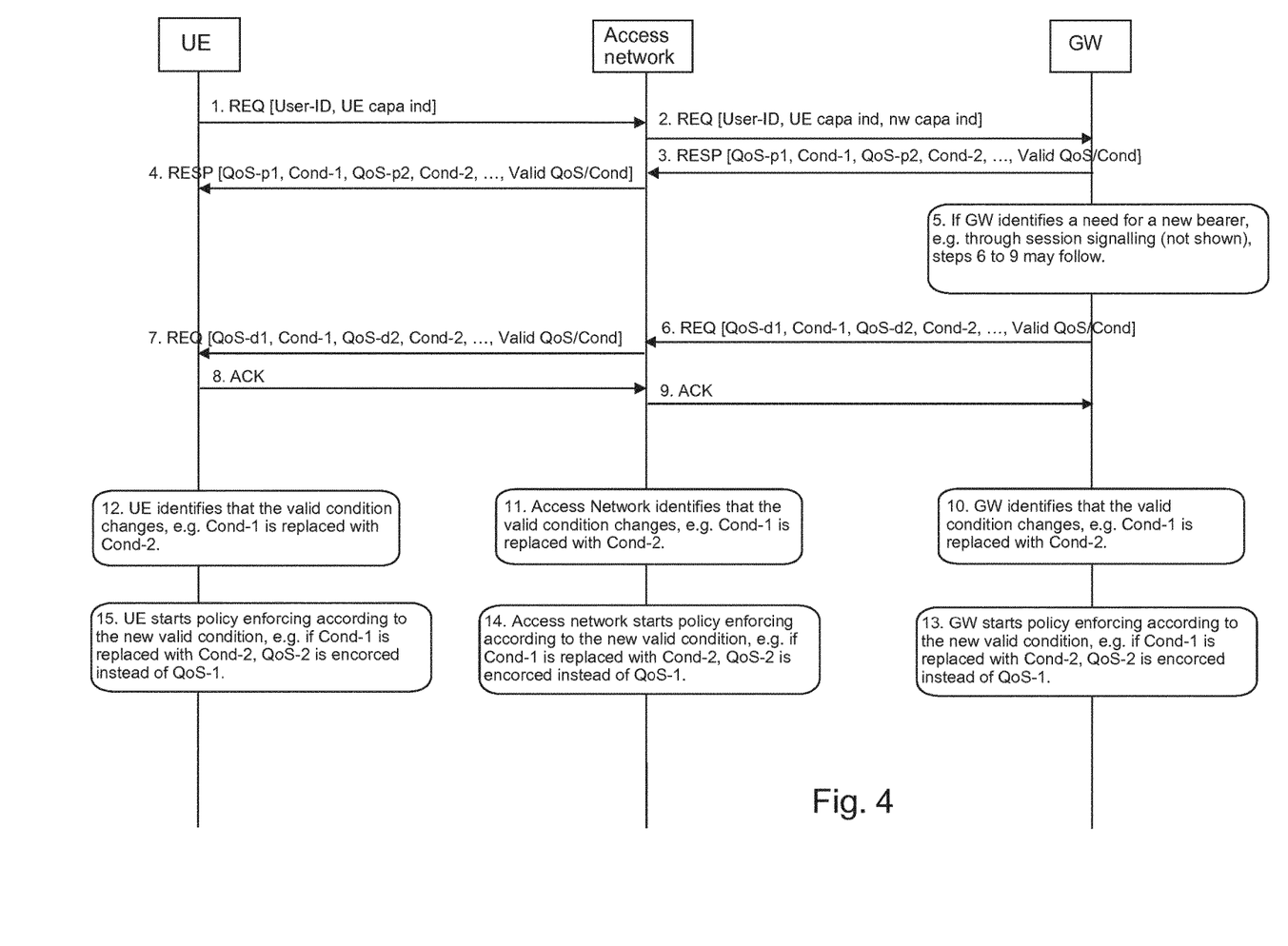
FIG. 4 shows a still further message flow according to an embodiment of the invention.

Steps 1-9 in FIGS. 3 and 4 describe the capability indication upon the IP-CAN session establishment according to some embodiments of the invention, and an optional further (dedicated) bearer establishment. Note that the GW of FIGS. 3 and 4 may correspond to the P-GW/PCEF of FIGS. 1 and 2, i.e. the P-GW comprising the PCEF.

According to embodiments of the invention, there are two different ways for the UE and access network to detect the activation or deactivation of a condition without a user session specific message flush in the access network, as shown in the exemplary message flows of FIGS. 3 and 4:

As shown in FIG. 3, the GW may indicate the condition information (e.g. condition-1 replaced with condition-2) with a common/non-user-session-specific message between the GW and an access network element (e.g. a GTP tunnel message between a P-GW and radio access network element). The access network may then use an access specific common message, e.g. a broadcast or multicast message, to send the condition information to the UEs.

As shown in FIG. 4, the UE and access network may locally detect the change of condition. An example of such a locally detectable condition is the time of day. The condition parameters signalled upon the IP-CAN session establishment or modifications just need to indicate the times/time periods, or in general the different conditions, for each QoS profile. (In the case of FIG. 4, it is preferred that the response messages 3 and 4 carry the capability indication parameters, too, to let every involved entity be aware of every other involved entity supporting the feature).

Figure 5:
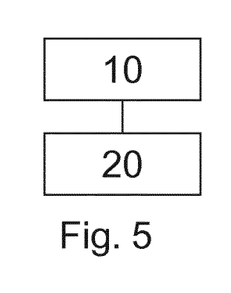
FIG. 5 shows an apparatus according to an embodiment of the invention.

FIG. 5 shows an apparatus according to an embodiment of the invention. The apparatus may be an online charging system. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises an identifying unit or means 10, and a pair providing unit or means 20.

Figure 6:
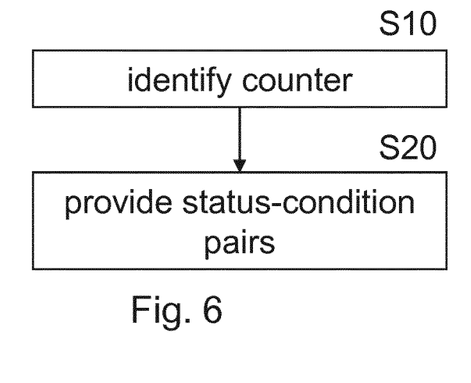
FIG. 6 shows a method according to an embodiment of the invention.

The identifying means 10 identifies a counter (in general: a policy controlled object) related to a user based on a received request message from a policy and charging rules function (S10).

The pair providing means 20 provide, in a response message to the policy and charging rules function, a first status-condition pair and a second status-condition pair of the counter, wherein each of the first and second status-condition pairs comprises a respective status of the counter and a corresponding condition when the respective status is to be applied (S20). Typically, the first status condition pair is different from the second status-condition pair.

Figure 7:
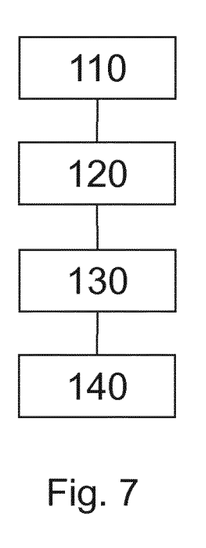
FIG. 7 shows an apparatus according to an embodiment of the invention.

FIG. 7 shows an apparatus according to an embodiment of the invention. The apparatus may be one of a PCRF, PCEF, P-GW, access network, and a user equipment. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises condition a determining unit or means 110, a selecting unit or means 120, a rule setting unit or means 130, and a rule applying unit or means 140.

Figure 8:
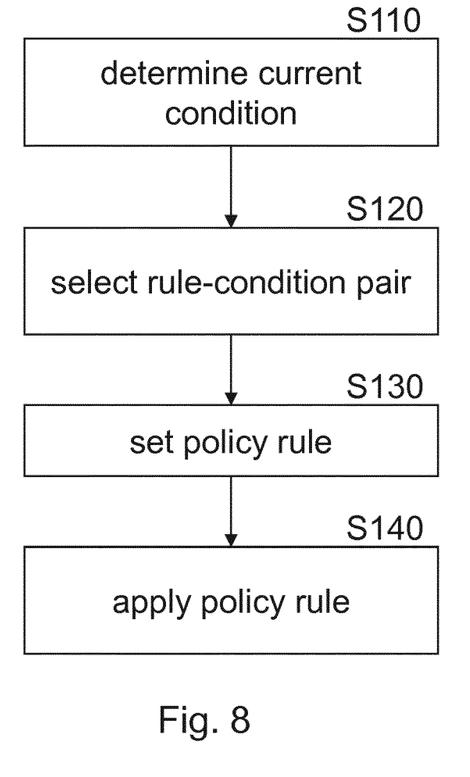
FIG. 8 shows a method according to an embodiment of the invention.

The condition determining means 110 determines a currently valid condition (S110), e.g. a time of the day or receipt of a message indicating the currently valid condition.

The selecting means 120 selects a rule-condition pair for a counter (in general: for a policy controlled object) of a user based on the currently valid condition as determined by the condition determining means 110 (S120). The rule condition pairs our of which the selecting means 120 selects are comprised in a received message, wherein each rule-condition pair comprises a respective policy rule for the counter of the user and a corresponding condition when the respective policy rule is to be applied. Typically, there are different rule-condition pairs in the message.

The rule setting means 130 sets the policy rule according to the rule-condition pair for the counter of the user selected by the selecting means 120 (S130).

The rule applying means 140 applies the set policy rule related to the counter of the user (S140).

Figure 9:
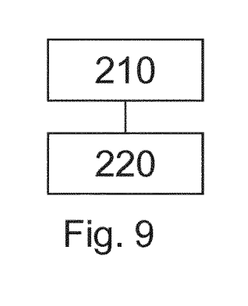
FIG. 9 shows an apparatus according to an embodiment of the invention.

FIG. 9 shows an apparatus according to an embodiment of the invention. The apparatus may be a policy and charging rules function. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises policy rules determining means 210 and pair providing means 220.

Figure 10:
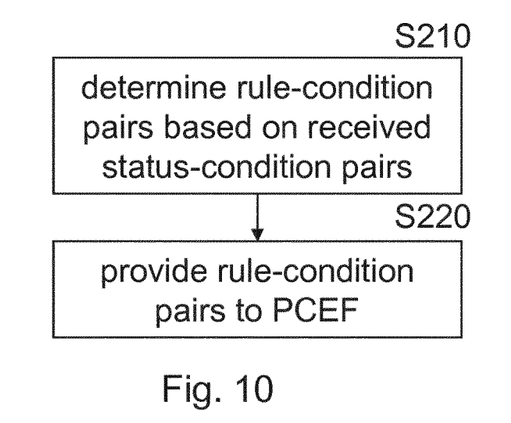
FIG. 10 shows a method according to an embodiment of the invention.

The policy rules determining means 210 determines plural rule-condition pairs for a counter (in general: for a policy controlled object) related to a user (S210). The rule-condition pairs are determined based on corresponding status-condition pairs of the counter comprised in a received message. Each of the first and second rule-condition pairs comprises a respective policy rule and a corresponding condition when the respective policy rule is to be applied. Typically, the first status-condition pair is different from the second status-condition pair.

The pair providing means 220 provides the rule condition pairs to a policy and charging enforcement function (S220)

Figure 11:
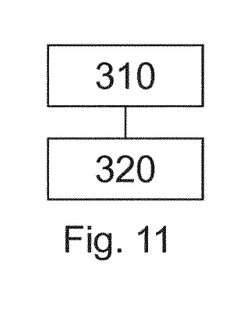
FIG. 11 shows an apparatus according to an embodiment of the invention.

FIG. 11 shows an apparatus according to an embodiment of the invention. The apparatus may be a policy and charging rules function. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises rule-condition pair generating unit or means 310 and pair providing unit or means 320.

Figure 12:
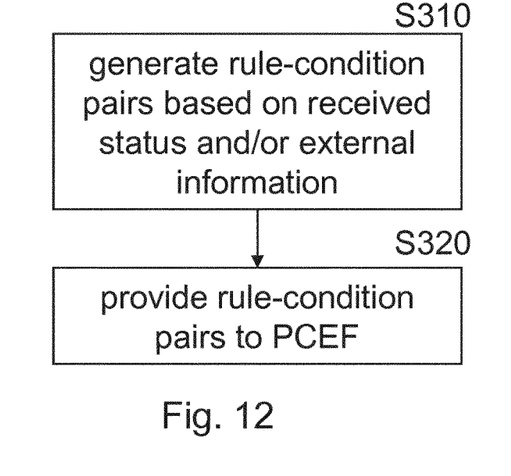
FIG. 12 shows a method according to an embodiment of the invention.

The rule-condition pair generating means 310 determines a first rule-condition pair and a second rule-condition pair for a policy controlled object related to a user (S310). Each of the first and second rule-condition pairs comprises a respective policy rule and a corresponding condition when the respective policy rule is to be applied. The first rule-condition pair and the second rule-condition pair are determined based on a status information of the policy controlled object comprised in a message received from an online charging device and in addition, or alternatively, based on an information received from another device different from the online charging device. The other device may be a subscription profile repository (SPR). The online charging device and the other device may be external from the apparatus or integrated with the apparatus. The information from the other device may comprise e.g. a policy counter or usage monitoring control information or user plane event reporting control information. Neither the status information nor the information from the other device may comprise rule-condition pairs. According to this embodiment, the rule-condition pairs are generated by the rule-condition pair generating means 310. The rule in each of the rule-condition pairs may comprise e.g. one or more usage reporting thresholds or triggers for user plane event reporting (e.g. which event to report under which condition). Typically, the first rule-condition pair is different from the second rule-condition pair.

The pair providing means 320 provides the rule-condition pairs to a policy and charging enforcement function (S320)

Embodiments of the invention are described with respect to a counter to which a policy is applied. However, the invention is not restricted to counters. Some embodiments of the invention may be applied to any other object to which a policy may be applied, such as a flag, a piece of information etc.

Embodiments of the invention are described with respect to an IMS network. However, embodiments of the invention may be applied to other networks where policy control is applied.

A user equipment may be any terminal such as a mobile phone, a smart phone, a computer, a laptop, a personal digital assistant etc.

An access network may be a wireless network such as a GSM, GPRS, UMTS, LTE, WLAN, WiFi network, or a wired network such as LAN, WAN, PSTN, ATM network.

If not otherwise stated or otherwise made clear from the context, the statement that two entities are different means that they are differently addressed in their respective network.

It does not necessarily mean that they are based on different hardware. That is, each of the entities described in the present description may be based on a different hardware, or some or all of the entities may be based on the same hardware.

According to the above description, it should thus be apparent that exemplary embodiments of the present invention provide, for example a charging apparatus such as an OCS, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a policy rule apparatus such as a PCRF, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a policy rule enforcement apparatus such as a PCEF, or a component thereof, an apparatus embodying the same, a method for controlling and/or operating the same, and computer program(s) controlling and/or operating the same as well as mediums carrying such computer program(s) and forming computer program product(s). Furthermore, it should thus be apparent that exemplary embodiments of the present invention provide, for example a access apparatus such as an access network, or a component thereof, an apparatus embodying the same, a method for controlling and/or operating the same, and computer program(s) controlling and/or operating the same as well as mediums carrying such computer program(s) and forming computer program product(s). Still furthermore, it should thus be apparent that exemplary embodiments of the present invention provide, for example a terminal such as a user equipment, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus, comprising
at least one processor; and
at least one memory including computer program code,
wherein the at least one memory and the computer program code are configured to, with the at least one processor, cause the apparatus at least to, in an online charging system,
identify a policy controlled counter related to a user based on a received request message from a policy and charging rules function;
provide, in a response message from the online charging system to the policy and charging rules function, a current status of the policy controlled counter and at least one status-condition pair of the policy controlled counter, wherein the at least one status-condition pair comprises a status of the policy controlled counter and a corresponding condition when the status is to be applied, the corresponding condition comprising a time when the status is to be applied.

2. The apparatus according to claim 1, wherein the at least one memory and the computer program code are configured to, with the at least one processor, cause the apparatus at least to provide an online charging function for the user.

3. A method, comprising, in an online charging system:
identifying a policy controlled counter related to a user based on a received request message from a policy and charging rules function;
providing, in a response message from the online charging system to the policy and charging rules function, a current status of the policy controlled counter and at least one status-condition pair of the policy controlled counter, wherein the at least one status-condition pair comprises a status of the policy controlled counter and a corresponding condition when the status is to be applied, the corresponding condition comprising a time when the status is to be applied.

4. A non-transitory computer readable medium encoded with a program comprising software code portions being arranged, when run on a processor of an apparatus, to perform the method according to claim 3.

* * * * *